United States Patent Office 3,375,170
Patented Mar. 26, 1968

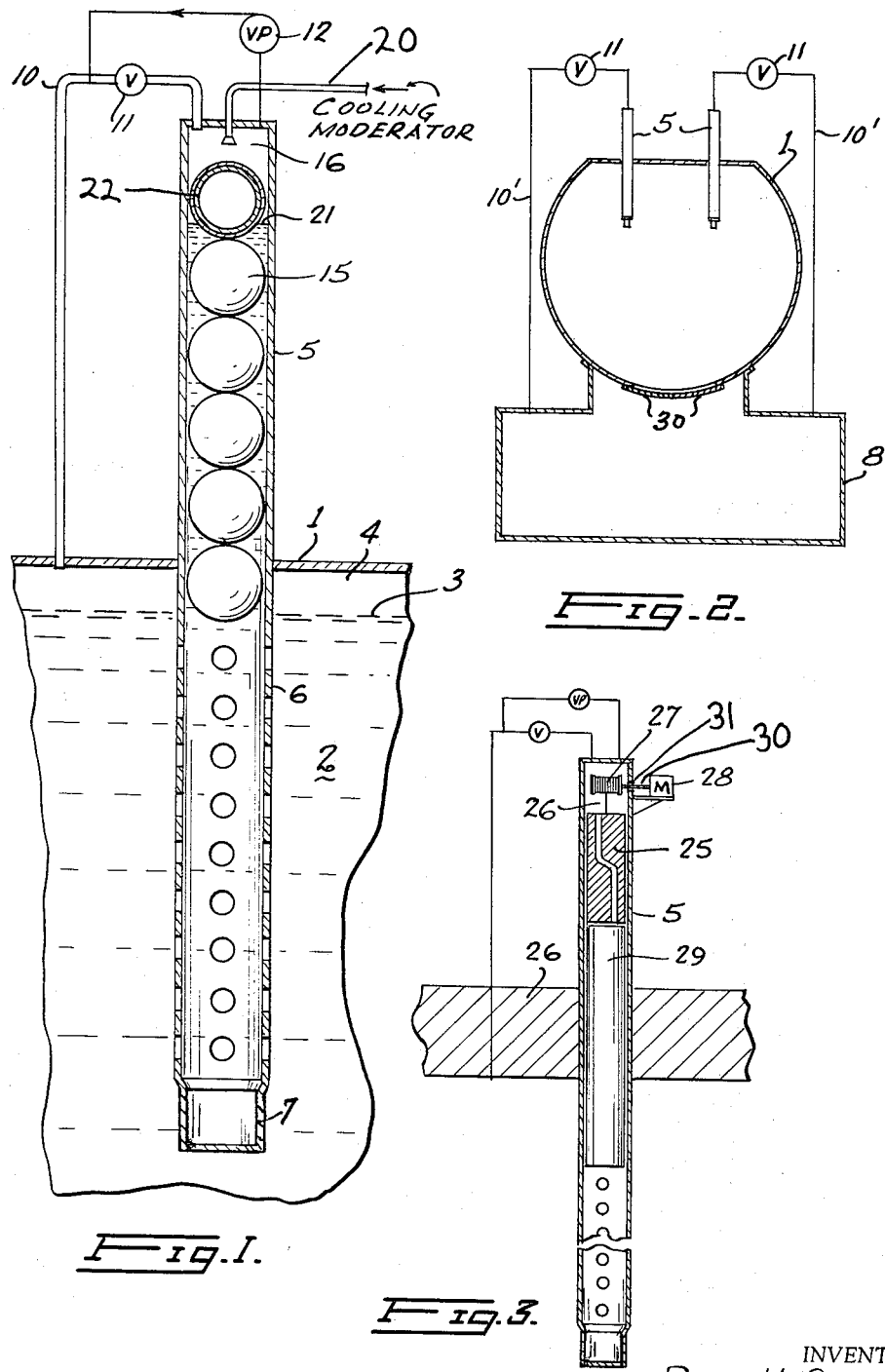

3,375,170
FLOATING ABSORBER SHUTOFF DEVICE
FOR NUCLEAR REACTOR
Philip H. Stubley, Clarkson, Ontario, Canada, assignor to Atomic Energy of Canada, Limited, Ottawa, Ontario, Canada, a corporation of Canada
Filed July 8, 1966, Ser. No. 563,791
7 Claims. (Cl. 176—35)

This invention relates to apparatus for reducing the level of operation of nuclear reactors and has particular reference to a device for rapid shut down of a reactor in emergency conditions.

In liquid moderated reactors, and particularly water and heavy water moderated types, it has become the practice to arrange the fuel rods in a supporting lattice forming the core, and to place a tank around the core called a calandria containing the liquid moderator. Channels are also provided in the lattice for forced flow cooling of the fuel rods. Beneath the calandria is a dump tank whose volume is sufficient to contain most of the moderator within the calandria. In the passage joining the calandria to the dump tank are specially constructed dump gates which can open when rapid shut down of the reactor is required. In normal operation pressure is maintained in the dump tank which opposes and is just sufficient to be in equilibrium with the hydrostatic pressure acting on the dump gates connecting the calandria to the tank. When rapid shut down is required the pressure is released, the gates open and the moderator is dumped into the tank. Further details of this type of structure are shown in U.S. Patent application 428,518 filed Jan. 26, 1965, in the name of Robert William Blackburn.

The present invention may be used in conjunction with the dump gate system, or it may be used instead. The invention is very rapid in operation, and in one embodiment for a calandria depth of 20 feet the conditions for full shut down could be achieved in 1.24 seconds. When used in conjunction with a dump system, they could be achieved in .827 second.

More particularly in accordance with the invention there is provided an absorber for a nuclear reactor, said reactor including a core and a moderator liquid within said core which comprises, a passage through said core extending vertically and above the normal level of moderator liquid in said core, a buoyant neutron absorber material in said channel, a conduit connecting the upper end of said channel to a pressure gas supply source, at a pressure at least as great as that on the surface of moderator liquid in said core, valve means in said conduit for preventing flow of pressure gas into said channel, and pump means for evacuating said channel, said absorber floating in liquid in said channel, above the normal level of liquid in said core, and being released for dropping into said core upon opening said valve.

A description of the invention now follows with reference to the accompanying drawings in which:

FIGURE 1 shows a side sectional view of part of the calandria of a nuclear reactor with the associated shut-down apparatus, FIGURE 2 shows a schematic view of a reactor with dump tank, and FIGURE 3 shows a sectional view of a modified embodiment of the invention in which the shut down apparatus also functions as a control rod.

With reference to FIGURE 1, a calandria 1 contains moderator 2 whose surface is at level 3. Above level 3 is a space 4 containing a non-reactive low neutron absorption gas such as helium. Into the calandria 1 extends a tube 5 which projects below the level 3 and then continues as a perforated tubular cage 6 down into the liquid 2. At the bottom of the cage 6 it is of slightly reduced section 7 and imperforate in order to act as a hydraulic snubber. The upper end of tube 5 is connected to a U-shaped balance line 10 which connects with the gas in space 4. Interposed in line 10 is a valve 11 (in practice triplicated for safety). A vacuum pump 12 which can exhaust the space in tube 5 bypasses valve 11.

Within the tube 5 a series of hollow neutron absorbing spheres 15 is arranged. These spheres are made to be of slightly lower specific gravity than the liquid in space 2 so that they will just float. The space 16 within tube 5 is then evacuated by pump 12 so that the spheres form a column floating in liquid within the tube 5. The level of liquid is raised so that the lowest sphere is in a region in which its absorption of neutrons passing through the moderator tube is negligible.

When the system is required to operate for emergency shut down of the reactor, valves 11 are opened, and gas from the pipe 10 and space 3 passes through the valves to equalize the pressure in space 16. The liquid column and the balls 15 fall together under gravity into the cage 6, displacing an equal volume of moderator, and reducing the reactivity in the core. The spheres are prevented from slamming into the bottom of the tube by hydraulic snubber 7 which is a close fit for the lowest of the balls in the column.

If preferred, the single balls forming the absorber column may be replaced by a cylinder of height approximately equal to the column, or alternatively by a number of cylinders. This, however, will require closer tolerance in the manufacture and fit between the absorber units and the tube 5 and cage 6 to prevent jamming. The use of balls is otherwise usually preferable as they make the system less susceptible to impaired operation caused by pressure or flow surges within the calandria.

In some instances it may be desirable to make certain that there is no chance of balance line 10 becoming flooded with moderator liquid. In the embodiment of FIGURE 2, the line 10′ can then be connected to the upper part of the dump tank 8. There is then no possibility of line 10′ becoming filled with liquid until the water level in the dump tank rises to its highest position, and at this time the level of liquid in the calandria 2 will be so low that the absorber column will no longer be required. In cases where no dump tank is used, it is a simple matter to connect an independent volume of helium under pressure to the line 10, the volume being sufficient to displace the liquid in tube 5. This helium volume may be connected to the space 4 to ensure that it is always at the same pressure as the liquid 2 at its surface 3.

In FIGURE 2, it will be noted that the pressure in each line 10′ is higher than that in space 4 because it is equal to the hydrostatic pressure at the bottom 30 of calandria 2. The effect therefore of opening valves 11 will be to drive the level of liquid 21 down to the base of the calandria. Since the spheres are a close fit in tube 5, they will also descend faster than they could by free fall under gravity, and they can be driven into their absorbing position typically in about two-thirds of the time required in the case considered for FIGURE 1.

The system may also be applied to a reactor using boiling moderator within the calandria. In this instance it is desirable that a small cooling flow be introduced to the top of the tube 5, such as shown by inlet pipe 20, so as to prevent flash boiling of the moderator standing in the tube 5, due to the lower pressure in the space 16. In a typical installation, at 500° F. moderator temperature, a temperature gradient of about 1° F. per foot of tube 5 would be adequate to prevent flash boiling of water moderator. The tube 10 and space 4 would contain moderator vapour rather than inert gas.

The reliability of the absorber column insertion system is as good as that of a moderator dump system, and any pressure surges within the calandria 1 after opening of the valves 11 will not affect the descent of the spheres 15 since the pressure on the surface 21 of the moderator liquid in tube 5 will be balanced by line 10.

The spheres 15 may, for example, be made of steel doped with a neutron absorbing element, or they may be steel, coated on the inner surface with an absorber 22 such as cadmium. A suitable buoyancey is 10% (so that the specific gravity is .9 times that of the moderator liquid). The spheres must be constructed so that they will not dent under the shock-load which is applied when the lower-most ball is snubbed by portion 7, and they must be able to withstand the hydrostatic pressure to which they are subjected. In a typical embodiment the spheres were of 3 inches in diameter and the column height was 20 feet, making a total of 80 spheres.

Using spheres 15 as the absorbers, makes maintenance and assembly relatively simple since they may be handled one at a time. Any leakage of moderator liquid into the absorbers will cause failure in a safe manner in that the absorber will tend to fall into the cage 6. If it is necessary to guard against such leakage each ball 15 can be made more buoyant so that (if they are not at the bottom of the column) several may leak before effective failure of the mechanism by descent of the balls. This feature requires that the failed balls not be near the bottom of the column.

In some reactors the tube 5 will be surrounded by neutron absorbing biological shielding 26 such as shown in FIGURE 3. A massive plug body 25 normally resides within an upper extension of tube 5. The plug 25 may then be mechanically lowered to complete the shielding 26. This action will force the absorber column down into the reactor as the mass of the plug 25 will override the buoyancy of the absorber column. The plug 25 may suitably be raised and lowered by a cable 26 carried round a drum 27 and driven by a motor 28.

In this embodiment the absorber thus may be used as a control rod for the reactor and the position of the plug 25 will define the position of the absorber within the reactor. The rapid insertion capability of the absorber still exists in this mode, as when the valve 11 is opened, the absorber column plus the liquid will fall away from the plug 25 into the reactor. In this case it is preferable that the absorber be a cylinder 29 rather than spheres, because noise during operation of the reactor due to movement of the column will be reduced. If the plug is not required for control of the reactor at any time it can be raised to its upper most position, and left there. The shaft 30 on cable drum 27 is sealed to the tube 5 at 31.

I claim:

1. In a nuclear reactor, said reactor including a core and a moderator liquid within said core, a channel in said core extending vertically through said core and above the normal level of the surface of the moderator liquid and the interior of said channel being in communication with the moderator liquid, a buoyant neutron absorber material in said channel, a pressure gas supply source, a conduit connecting the upper end of said channel to the source, the pressure of said gas supply source being greater than that on the said surface of said moderator liquid in said core, valve means in said conduit for preventing flow of pressure gas into said channel, and pump means for evacuating gas from said channel and for causing liquid entry into said channel and rising of the surface of the last mentioned liquid above the level of said surface of liquid in said core, said absorber floating in the liquid in said channel, and the level of the surface of the liquid in said channel being chosen whereby said absorber rises above said level of the surface of moderator liquid in said core, said absorber dropping into said core below the said level of the surface of the moderator liquid in said core upon opening of said valve and consequent connection of said channel to said pressure gas source, a dump space below said core for receiving moderator liquid upon its release from said core, means for maintaining gas in said dump space under pressure and means retaining said moderator liquid within said core in the presence of chosen gas pressure within said dump space, and means connecting said conduit to gas in said dump space, said pressure gas supply source comprising said gas in said dump space.

2. Apparatus as defined in claim 1, said absorber comprising a column of spheres.

3. Apparatus as defined in claim 1, said absorber comprising a buoyant cylinder extending longitudinally in said channel.

4. Apparatus as defined in claim 1, said absorber comprising steel doped with a neutron absorbing material.

5. Apparatus as defined in claim 1, said absorber comprising hollow vessels internally coated with a neutron absorbing material.

6. Apparatus as defined in claim 1, comprising a massive body above said absorber, said body being of a weight sufficient for submerging said absorber in said moderator liquid in said channel, and means supporting said body and permitting movement of said body in a vertical direction under its own weight for moving said absorber below the level of the surface of liquid in said core dependent upon operation of said supporting means and independently of said valve means.

7. Apparatus as defined in claim 6, said supporting means comprising a motor, a cable drum operatively connected to said motor, and a cable on said drum and attached to said massive body.

References Cited

UNITED STATES PATENTS

| 3,223,589 | 12/1965 | Ziegler | 176—22 |
| 3,257,286 | 6/1966 | Ryon et al. | 176—22 |

FOREIGN PATENTS

| 904,331 | 8/1962 | Great Britain. |
| 969,089 | 9/1964 | Great Britain. |
| 1,005,177 | 9/1965 | Great Britain. |

CARL D. QUARFORTH, *Primary Examiner.*

L. DEWAYNE RUTLEDGE, *Examiner.*

H. E. BEHREND, *Assistant Examiner.*